United States Patent
Saito

(10) Patent No.: US 8,090,854 B2
(45) Date of Patent: Jan. 3, 2012

(54) SERVICE PROVIDING METHOD

(75) Inventor: Takeshi Saito, Koga (JP)

(73) Assignee: International Business Link Co., Ltd., Fukuoka-shi (JP)

( * ) Notice: Subject to any disclaimer, the term of this patent is extended or adjusted under 35 U.S.C. 154(b) by 0 days.

(21) Appl. No.: 12/855,329

(22) Filed: Aug. 12, 2010

(65) Prior Publication Data

US 2010/0306395 A1 Dec. 2, 2010

Related U.S. Application Data

(63) Continuation of application No. 10/363,066, filed as application No. PCT/JP01/07606 on Sep. 3, 2001, now abandoned.

(30) Foreign Application Priority Data

Sep. 1, 2000 (JP) ................................. 2000-266075

(51) Int. Cl.
*G06F 15/16* (2006.01)
*G06F 15/173* (2006.01)
*G06F 21/00* (2006.01)

(52) U.S. Cl. ........ 709/229; 709/203; 709/217; 709/218; 709/219; 709/223; 709/224; 709/225; 709/226; 709/227; 709/228; 713/156; 713/175; 713/180; 713/150; 713/155; 713/182; 713/186; 726/3; 726/4; 726/8; 726/14; 726/27; 726/28; 726/29; 726/30; 705/44; 705/51; 705/52; 705/53; 705/54; 705/59; 705/56; 707/999.003; 707/999.01; 707/999.1

(58) Field of Classification Search .................. 709/203, 709/217–219, 223–229; 707/3, 10, 100; 713/200–202, 150, 155, 156, 175, 180, 182, 713/184, 186; 726/3–4, 8, 14, 27–30; 705/44, 705/51–54, 56, 59; 395/200.68, 200.53, 395/200.47
See application file for complete search history.

(56) References Cited

U.S. PATENT DOCUMENTS

| 5,867,665 | A | * | 2/1999 | Butman et al. ................. 709/239 |
| 5,869,819 | A | * | 2/1999 | Knowles et al. .............. 235/375 |
| 5,905,248 | A | * | 5/1999 | Russell et al. ........... 235/462.15 |
| 5,913,210 | A | * | 6/1999 | Call ..................................... 1/1 |
| 5,974,572 | A | * | 10/1999 | Weinberg et al. .............. 714/47 |
| 6,006,334 | A | * | 12/1999 | Nguyen et al. .................... 726/5 |
| 6,128,644 | A | * | 10/2000 | Nozaki ......................... 709/203 |
| 6,167,518 | A | * | 12/2000 | Padgett et al. ................ 713/186 |
| 6,321,339 | B1 | * | 11/2001 | French et al. ..................... 726/2 |
| 6,333,787 | B1 | * | 12/2001 | Konno ......................... 358/1.13 |

(Continued)

FOREIGN PATENT DOCUMENTS

JP 11-306139 11/1999

(Continued)

*Primary Examiner* — Khanh Dinh
*Assistant Examiner* — Saket K Daftuar
(74) *Attorney, Agent, or Firm* — Jordan and Hamburg LLP

(57) ABSTRACT

The frequency of reading, by users, Web sites managed by Web masters is increased. A server computer of a service provider providing a variety of services can be accessed from one of the Web sites of registered Webmasters. The server computer registers a client who has accessed it through one of the Web sites. Only when the registered client accesses the service provider through the Web site, the client can receive any one of the services.

1 Claim, 3 Drawing Sheets

U.S. PATENT DOCUMENTS

| | | | |
|---|---|---|---|
| 6,668,322 B1 * | 12/2003 | Wood et al. | 713/182 |
| 6,691,232 B1 * | 2/2004 | Wood et al. | 726/6 |
| 6,697,947 B1 * | 2/2004 | Matyas et al. | 713/182 |
| 6,728,884 B1 * | 4/2004 | Lim | 726/12 |
| 6,771,291 B1 * | 8/2004 | DiStefano, III | 715/762 |
| 6,850,252 B1 * | 2/2005 | Hoffberg | 715/716 |
| 7,031,968 B2 * | 4/2006 | Kremer et al. | 707/706 |
| 7,072,934 B2 * | 7/2006 | Helgeson et al. | 709/203 |
| 7,080,077 B2 * | 7/2006 | Ramamurthy et al. | 707/754 |
| 7,120,800 B2 * | 10/2006 | Ginter et al. | 713/193 |
| 7,134,137 B2 * | 11/2006 | Joshi et al. | 726/1 |
| 7,143,055 B1 * | 11/2006 | Perkowski | 705/26 |
| 7,145,898 B1 * | 12/2006 | Elliott | 370/352 |
| 7,171,567 B1 * | 1/2007 | Bayer et al. | 713/193 |
| 7,194,764 B2 * | 3/2007 | Martherus et al. | 726/8 |
| 7,353,283 B2 * | 4/2008 | Henaff et al. | 709/229 |
| 7,356,841 B2 * | 4/2008 | Wilson et al. | 726/15 |
| 7,415,468 B1 * | 8/2008 | Hijl | 1/1 |
| 7,464,162 B2 * | 12/2008 | Chan | 709/225 |
| 2001/0011274 A1 * | 8/2001 | Klug et al. | 707/9 |

FOREIGN PATENT DOCUMENTS

| | | |
|---|---|---|
| JP | 2000-013524 | 1/2000 |
| JP | 2000-029883 | 1/2000 |
| JP | 2001-325219 | 11/2001 |
| JP | 2001-325229 | 11/2001 |
| JP | 2002-041349 | 2/2002 |

* cited by examiner

SERVICE PROVIDING METHOD

CROSS REFERENCE TO RELATED APPLICATIONS

This application is a Continuation of and is based upon and claims the benefit of priority for U.S. Ser. No. 10/363,066, filed on May 22, 2003, which is the national stage entry of PCT/JP2001/07606, filed on Sep. 3, 2001, which claims the benefit of Japanese Patent Application No. 2000-266075, filed on Sep. 1, 2000, and claims the benefit of priority from Japanese Patent Application No. 2000-266075, filed on Sep. 1, 2000, the entire contents of each which are incorporated herein by reference.

FIELD OF THE INVENTION

The present invention relates to a service providing method for providing services via an electronic communication network such as an internet.

BACKGROUND OF THE INVENTION

There have been an increasing number of Webmasters opening their own Web sites on an internet becoming widespread in these years for providing a variety of information or services through the Web sites.

What the Webmasters put the greatest emphasis on is how the Web sits of the Webmasters can be read by more users. For that purpose, the Webmasters are making their efforts to provide readers with more services which render their own Web sites attractive and increase the frequency of reading, by users, the Web sites.

Many of the Webmasters utilize rental servers to open their Web sites for providing a variety of services for clients who have accessed the Web sites. For providing the services, they have planed and made up independent programs.

However, the Webmasters should consume a great amount of labor, time and cost for planning and making up many independent service providing programs. It is not so easy to render their own Web sites attractive and increase the reading frequency. Besides, the rental server, when utilized, has constraints including available capacity, which have precluded many service providing programs and an enormous volume of accompanying data from being stored in the rental servers and possibly forced the operational abandonment of the Web sites in this process.

On the other hand, service providers who developed the service providing programs with great efforts and managed to actually operate Web sites could provide services only for users actually reading their own Web sites. In order to provide the services for more users, they should have consume additional labor and cost for the advertisement of their services. It hasn't been, therefore, easy to attain smooth operation of the Web sites.

DISCLOSURE OF THE INVENTION

According to the present invention, a server computer of a service provider providing a variety of services can be accessed from one of Web sites of registered Webmasters, wherein the server computer previously registers a client who has accessed it through one of the Web sites, and only when the registered client accesses the service provider through the Web site, the client can receive any one of the services.

Specifically, an internet service providing method comprises using client registering means for allowing the server computer to register a client identification symbol for identifying the client, who has accessed the server computer of the service provider providing a variety of services from one of the Web sites of the registered Webmasters, and an address of the Web site, identification symbol and address acquiring means for allowing the server computer to acquire the client identification symbol and the address of the Web site when the client to receive any one of the services has accessed the server computer from the Web site, client certifying means for certifying the client only when the client identification symbol and the address of the Web site acquired by the identification symbol and address acquiring means correspond to the client identification symbol and the address of the Web site registered by the client registering means, and service providing means for providing the variety of services only for the client certified by the client certifying means.

BEST MODES FOR CARRYING OUT THE INVENTION

Figure 1:
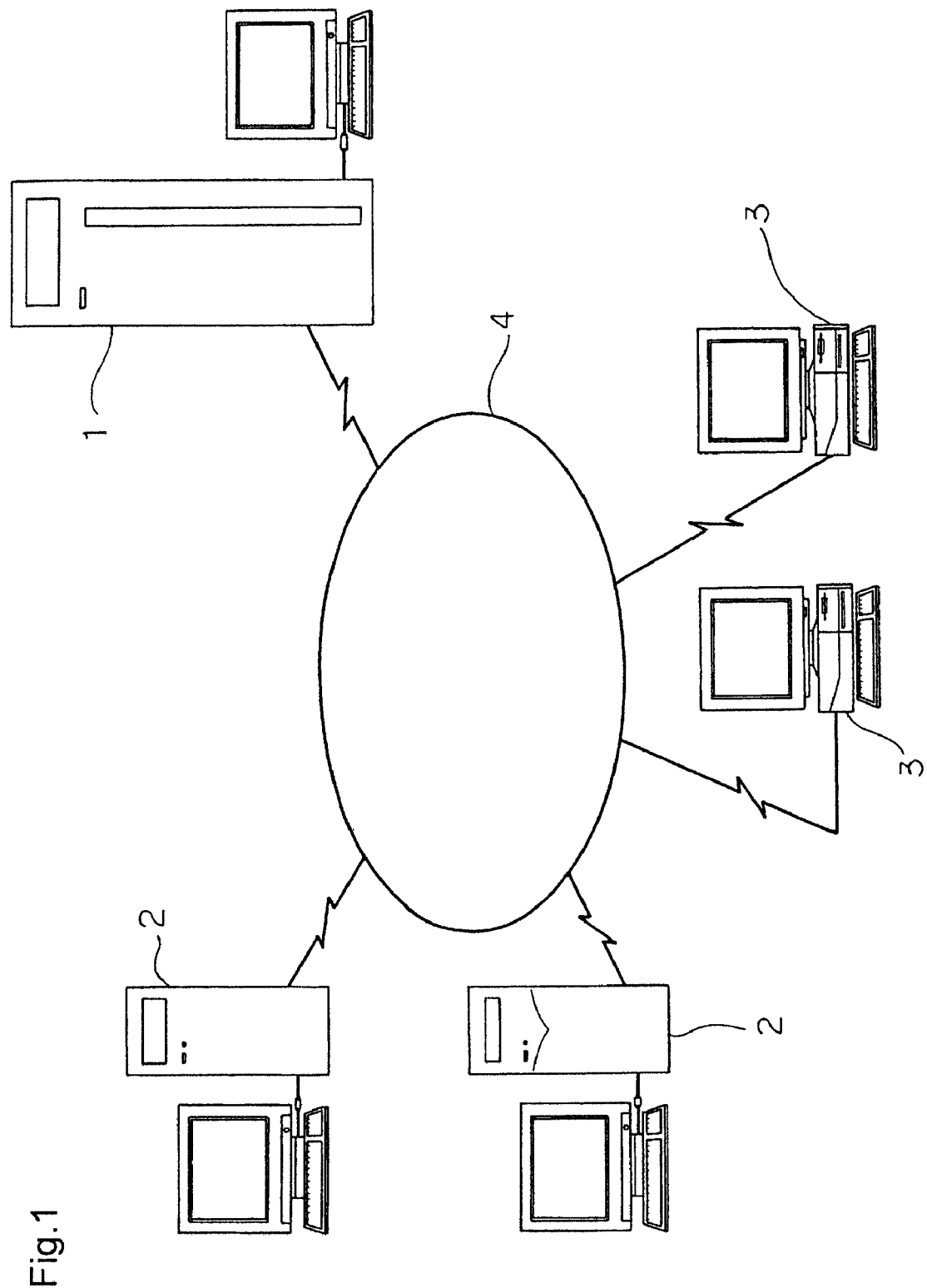
FIG. 1 is an explanatory view showing an internet service providing method according to the invention.

The present invention is directed to provide services via an internet, as described below.

(1) A service provider for providing a variety of services keeps previously registered addresses of Web sites of Webmasters in a server computer managed by himself.

(2) The client who attempts to receive any one of the services provided by the service provider first accesses one of the Web sites of the Webmasters and then accesses the server computer of the service provider through the Web site for registration work.

At this time, the server computer of the service provider registers a client identification symbol input by the client for identifying the client and an address of the Web site used in accessing (client registering means).

(3) Then, the client accesses the Web site used in registration again and accesses the server computer of the service provider from the Web site.

At this time, the client inputs his own client identification symbol on the Web site. Information about the client identification symbol and the address of the Web site is given to the server computer, whereby the server computer acquires the client identification symbol and the address of the Web site (identification symbol and address acquiring means).

(4) Then, the server computer of the service provider determines whether the client identification symbol and the address of the Web site acquired by the identification symbol and address acquiring means correspond to the client identification symbol and the address of the Web site previously registered by the client registering means or not, and gives certification to the client to permit the utilization of a service providing program stored in the server computer only when they correspond thereto (client certifying means).

If the client identification symbol and the address of the Web site do not correspond thereto, such a message is given to the client for rejecting the utilization of the service providing program in the server computer.

(5) Finally, any of the services are provided only for the client who is certified by the client certifying means (service providing means).

According to the invention, the server computer of the service provider providing the variety of services can be accessed from one of the Web sites of the registered Webmasters, wherein the server computer previously registers the client which has accessed it through one of the Web sites, and only when the registered client accesses it through the Web site used in registration, the client can receive any one of the services.

Thus, the Webmaster can utilize the service providing program developed by the service provider to provide the client with any one of the services which renders the Web site attractive to the client and easily increases the frequency of reading the Web site.

The service provider can provide his own services through the plurality of Web sites and easily and quickly collect expenses required for developing the service providing program while conveniently increasing the frequency of utilizing the services.

The client can avoid troublesome work for finding the Web site of the service provider providing the services as desired and easily receive any one of the services via the internet.

DETAILED DESCRIPTION OF THE PREFERRED EMBODIMENTS

More specific embodiments of the invention are described below with reference to drawings.

As shown in FIG. 1, a server computer 1 managed by a service provider providing a variety of services (for example, a service for providing information about commodities and selling commodities, a service for granting e-mail addresses to make e-mail available and a service for searching Web sites), computers 2 managed by a plurality of Webmasters opening the Web sites, and client computers 3 managed by a plurality of clients who read the Web sites of the Webmasters are connected to one another via an internet (a communication network) 4. Herein, the computers 2 managed by the Webmasters include computers for rental servers utilized by the Webmasters without being limited to computers owned by the Webmasters themselves. The client computers 3 include mobile communication equipment such as portable telephones.

Under such internet environment, the service provider provides the services for the clients with the intervention of the Webmasters.

Figure 2:
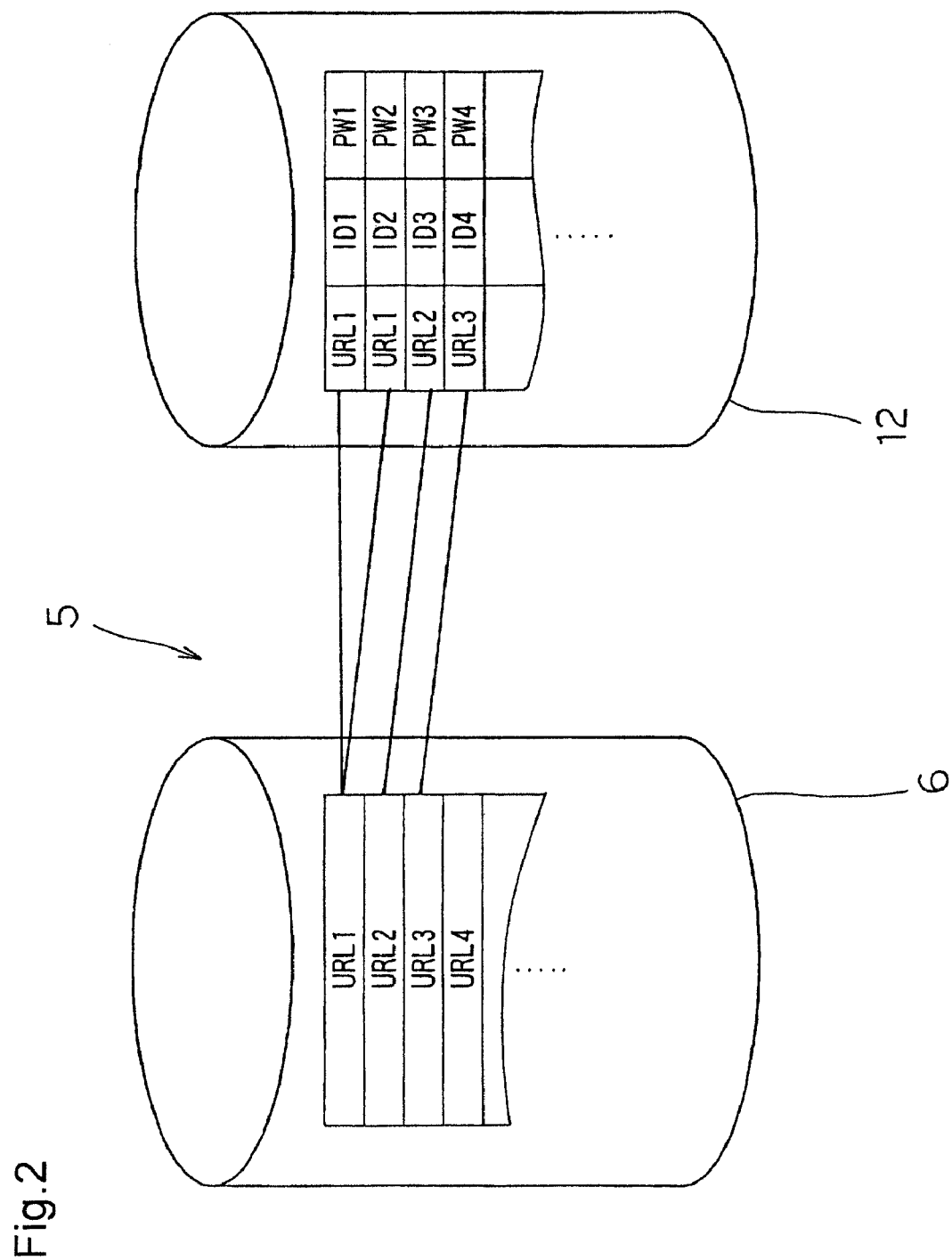
FIG. 2 is an explanatory view showing a database structure.

First, the service provider providing the variety of services keeps previously registered addresses (URL) of the Web sites of the Webmasters in the server computer being managed by himself. Specifically, as shown in FIG. 2, a Web site address database 6 in which the addresses (URL) of the Web sites of the Webmasters are stored in sequence is previously made up in a memory 5 connected to the server computer 1.

The client who attempts to receive any one of the services provided by the service provider utilizes the client computer 3 to access one of the Web sites of the Webmasters.

Thereupon, a service utilization starting screen 7 is displayed on the Web-site. The service utilization starting screen 7 contains a user ID input part 8 and a password input part 9, where the client can optionally set and input his user ID and password, a sign-up button 10 and a log-in button 11.

The client inputs a client identification symbol consisting of the user ID and the password optionally set by the client to the user ID input part 8 and the password input part 9 and then operates the sign-up button 10.

Following this operation, the computer 2 of the Webmaster gives information about the client identification symbol and the address of the Web site to the server computer 1.

After receiving the information, the server computer 1 ascertains whether the address of the Web site corresponds to the address previously registered in the Web site address database 6 or not, and if it does not correspond thereto, such a message and an address list previously registered are displayed on the service utilization starting screen 7 and reported to the client.

In this way, even when the server computer 1 is accessed in error from the Web site, not previously registered by the server computer 1, such as a Web site which is originally registered by the server computer 1 but erased thereafter due to the break-off of an agreement, the client can be informed of the address of a Web site being registered and he can steadily learn the Web site adaptable for the service. The client himself can therefore save labor for searching the Web site adaptable for the service, resulting in improved conveniences.

On the other hand, if the address corresponds thereto, the server computer 1 registers the client. Specifically, as shown in FIG. 2, a client database 12 in which client identification symbols each consisting of a user ID and a password set by clients and addresses (URL) of Web sites of Webmasters used in registration are stored in sequence is made up in the memory 5 connected to the server computer 1. Still, When the user ID, the password and the address of the Web site are the same as those already registered, such a message is displayed on the service utilization starting screen 7 and reported to the client.

Thus, the server computer 1 of the Webmaster registers the client identification symbol input by the client for identifying the client and the address of the Web site used in accessing (client registering means).

Secondly, when desiring the service to be provided by the service provider, the client utilizes the client computer 3 to access the Web site used in registration, again.

Figure 3:
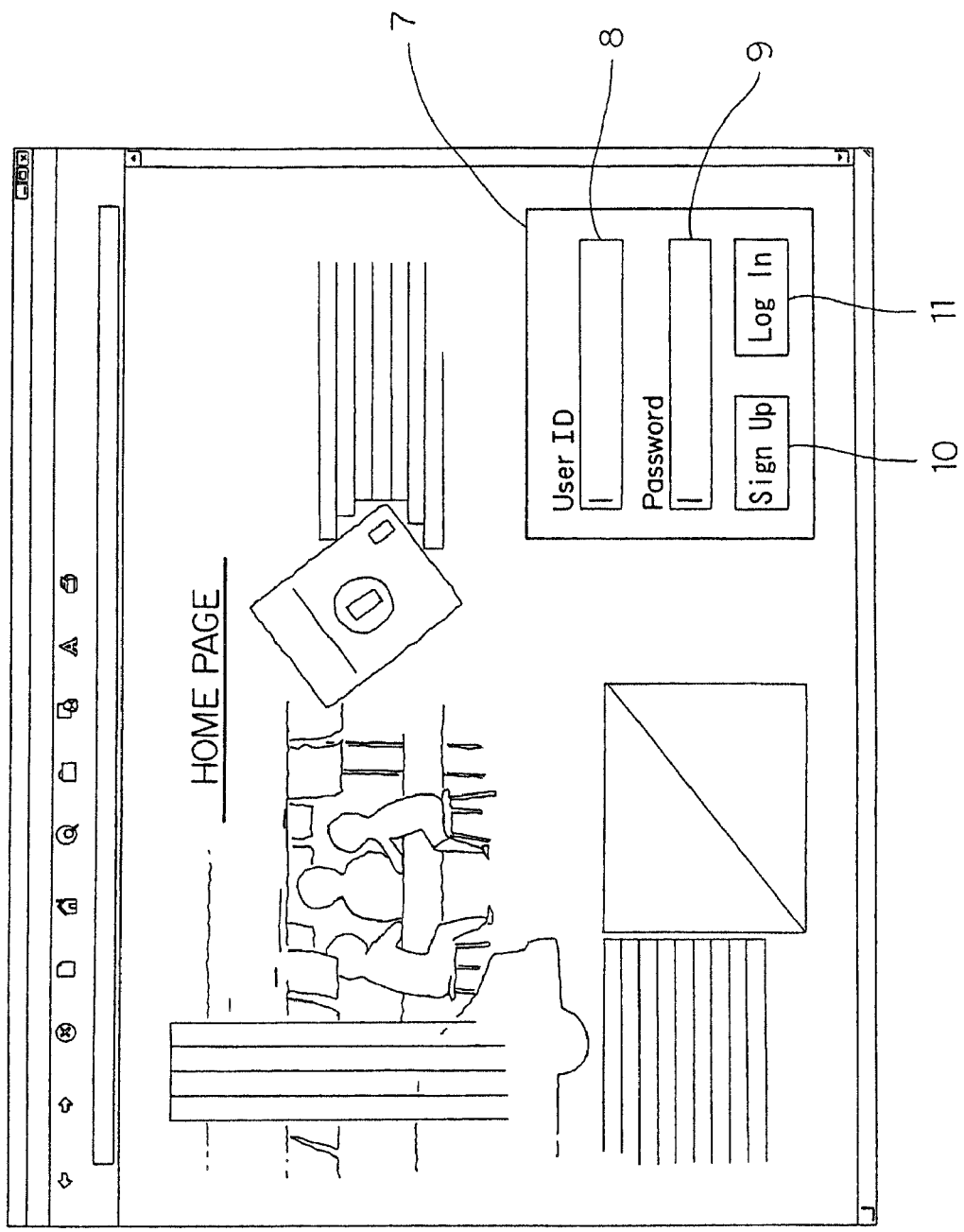
FIG. 3 is an explanatory view showing a service utilization starting screen.

Thereupon, the service utilization starting screen 7 is displayed on the Web site again, as shown in FIG. 3. On the service utilization starting screen 7, the client inputs the user ID and the password, optionally set by himself, to the user ID input part 8 and the password input part 9, respectively, and then operates the log-in button 11.

Following this operation, the computer 2 of the Webmaster gives information about the client identification symbol and the address of the Web site to the server computer 1.

Thus, the client inputs his client identification symbol through the Web site and the information about the client identification symbol and the address of the Web site are given to the server computer 1, whereby the server computer 1 acquires the client identification symbol and the address of the Web site (identification symbol and address acquiring means).

Receiving the information, the server computer 1 first ascertains whether the address of the Web site corresponds to the address previously registered in the Web site address database 6 or not, and if it does not correspond thereto, such a message and the address list previously registered are displayed on the service utilization starting screen 7 and reported to the client.

In this way, even when the server computer 1 is accessed in error from the Web site, not previously registered by the server computer 1, such as a Web site which is originally registered in the server computer 1 but erased thereafter due to the break-off of an agreement, the client can be informed of the address of a Web site being registered and he can steadily learn the Web site adaptable for the service. The client himself can therefore save labor for searching the Web site adaptable for the service, resulting in improved conveniences.

Thirdly, receiving the information, the server computer 1 ascertains whether the user ID, the password and the address of the Web site correspond to the user ID, the password and the Web site address, previously registered in the client database 12, or not.

If the user ID or the password does not correspond thereto, such a message is displayed on the service utilization starting screen 7 and reported to the client, and if the Web site address does not correspond thereto, the regular address of the Web site being registered is displayed on the service utilization starting screen 7 and reported to the client. In these cases, the server computer 1 rejects the utilization of the service providing program.

On the other hand, if the user ID, the password and the address of the Web site completely correspond to the user ID, the password and the address of the Web site previously registered in the client database 12, the server computer 1 certifies that the client can utilize the service providing program stored in the server computer.

Thus, the server computer 1 determines whether the client identification symbol and the address of the Web site correspond to those registered by the client registering means or not, and only when they correspond thereto, the server computer 1 certifies that the client can utilize the service providing program stored in the server computer (the client certifying means).

Lastly, any one of the services is provided only for the client certified by the client certifying means (the service providing means).

The Web site address database 6 and the client database, stored in the server computer 1, are coordinated with each other. When the registered Web site is erased thereafter due to the break-off of an agreement or the like, data for the address of the Web site is removed from the Web site address database 6 and data for the client registered via the same address is removed from the client database 12.

In this case, data is removed from the client database 12 as well as the client is informed of such a message and the address list of registered Web sites, and so the client can continue to receive the service by means of re-registration from another Web site without suffering sudden cut-off of the service.

Thus, according to the invention, the server computer 1 of the service provider providing the variety of services can be accessed from one of the Web sites of the registered Webmasters, wherein the server computer 1 previously registers the client who has accessed it through one of the Web sites, and only when the registered client accessed the service provider through the Web site used in registration, the client can receive any one of the services.

INDUSTRIAL AVAILABILITY

This invention embodied by the above embodiments advantageously provides such effects as described below.

Namely, according to the invention, a server computer of a service provider providing a variety of services can be accessed from one of the Web sites of registered Webmasters, wherein the server computer previously registers a client who has accessed it through one of the Web sites, and only when the registered client accessed the service provider through the Web site used in registration, the client can receive any one of the services. The following effects are provided for the Webmasters, the service provider and the clients.

The Webmasters can utilize a service program developed by the service provider to provide the variety of services for the clients without developing their independent programs and to operate the Web sites without consuming labor and cost, the Web sites being attractive to the clients and helpful in increasing the frequency of reading the Web sites.

The service provider can provide the services not only for the clients who have read his own Web site but also for the clients who have read the other Web sites of the Webmasters and easily and quickly collect expenses required for developing the service providing program while conveniently increasing the frequency of utilizing the services.

The clients can receive the variety of services through the Web sites which they usually read frequently and so they can avoid troublesome labor for searching the web site of the service provider providing the services as desired and easily receive the services via the interne.

What is claimed is:

1. A service providing method comprising the following steps, in sequence, of:
   a) connecting a single server computer of one service provider which provides service providing programs originally developed by the service provider and a single client computer of a client who receives services provided by the service provider via any single one of website computers of a plurality of web masters which open websites on an Internet so that the client can utilize one or more service providing programs of the service provider as a result of an agreement between the service provider and a respective web master that the service provider will provide, so as to allow access by a client to, such one or more service providing programs;
   b) allowing the service provider to previously register website addresses of the respective websites opened by the plurality of web masters in a website address database of the single server computer;
   c) allowing the client who attempts to receive any one of the service providing programs provided by the service provider to access the website of any one of the plurality of web masters from the client computer;
   d) allowing the website computer of the web master to display a service utilization starting screen on the website in response to the access to the website by the client;
   e) allowing the client to input a client identification symbol to the website computer by way of the service utilization starting screen;
   f) allowing the website computer to give the client identification symbol and the website address of the website accessed by the client to the server computer;
   g) allowing the server computer, after receiving the client identification symbol and the website address of the website accessed by the client, to ascertain whether or not the website address of the website accessed by the client corresponds to one of the website addresses which is previously registered in the website address database of the server computer, wherein
   if the website address of the website accessed by the client is not previously registered, such a message that the website address of the website accessed by the client and received by the server computer along with the client identification symbol is not among those website addresses previously registered in the website address database of the server computer and an address list of those website addresses previously registered in the website address database of the server computer are displayed on the service utilization starting screen and are reported to the client, and
   if the website address of the website accessed by the client is previously registered, the server computer registers the client identification symbol and the website address of the website accessed by the client, as a set, in a client database of the server computer;

h) allowing the client to again access the website of the website computer used in the registration of the client identification symbol and to input the client identification symbol using the service utilization starting screen of the website computer;

i) allowing the website computer to give the inputted client identification symbol and the inputted website address of the website used by the client when the client again accessed the website of the website computer used in the registration of the client identification symbol to the server computer;

j) allowing the server computer which receives the client identification symbol and the website address of the website used by the client when the client again accessed the website of the website computer used in the registration of the client identification symbol to ascertain whether or not both the received client identification symbol and website address of the website used by the client when the client again accessed the website of the website computer used in the registration of the client identification symbol correspond to both the client identification symbol and the website address previously registered in the client data base, wherein if the received client identification symbol does not correspond to the client identification symbol previously registered in the client data base, such a message that the inputted client identification symbol is not registered in the client data base is displayed on the service utilization starting screen and is reported to the client, and the server computer rejects the utilization of the service providing program, if the received website address of the website used by the client when the client again accessed the website of the website computer used in the registration of the client identification symbol does not correspond to the website address previously registered in the client data base, an address list of website addresses being registered in the website address database of the server computer is displayed on the service utilization starting screen and is reported to the client, and the server computer rejects the utilization of the service providing program, and if both the received client identification symbol and the website address of the website used by the client when the client again accessed the website of the website computer used in the registration of the client identification symbol correspond to both the client identification symbol and the website address previously registered in the client data base, the server computer certifies that the client can utilize the service providing program stored in the server computer, and if the received client identification symbol and the website address of the website used by the client when the client again accessed the website of the website computer used in the registration of the client identification symbol do not correspond to the client identification symbol and the website address previously registered in the client data base, the server computer rejects the utilization of the service providing program, wherein the website address database and the client database stored in the server computer are coordinated with each other such that when the previously registered website is erased thereafter due to a break-off of the agreement between the service provider and a respective webmaster of a website previously registered by the service provider, the server computer erases the website address of the website of the web master with whom the break-off of the agreement occurred from the website address database and removes the client identification symbol previously registered via the same website address from the client database, and when the server computer removes the client identification symbol from the client database, the server computer reports such a message and the address list of the registered websites in the website address database of the server computer, whereby the service provider can easily and quickly collect expenses required for originally developing the service providing program from the plurality of webmasters or the plurality of clients.

* * * * *